United States Patent
Aizawa et al.

(10) Patent No.: US 10,611,914 B2
(45) Date of Patent: Apr. 7, 2020

(54) METHOD FOR REMOVING GENIPOSIDE OR GENIPIN OR BOTH

(71) Applicant: SAN-EI GEN F.F.I., INC., Osaka (JP)

(72) Inventors: Ryosuke Aizawa, Osaka (JP); Tsuyoshi Fujita, Osaka (JP); Hironori Onishi, Osaka (JP)

(73) Assignee: SAN-EI GEN F.F.I., INC., Osaka (JP)

( * ) Notice: Subject to any disclaimer, the term of this patent is extended or adjusted under 35 U.S.C. 154(b) by 0 days.

(21) Appl. No.: 15/522,539

(22) PCT Filed: Oct. 30, 2015

(86) PCT No.: PCT/JP2015/080826
§ 371 (c)(1),
(2) Date: Apr. 27, 2017

(87) PCT Pub. No.: WO2016/068330
PCT Pub. Date: May 6, 2016

(65) Prior Publication Data
US 2017/0362437 A1    Dec. 21, 2017

(30) Foreign Application Priority Data
Oct. 30, 2014    (JP) .................. 2014-221911

(51) Int. Cl.
| C09B 61/00 | (2006.01) |
| A23L 5/42 | (2016.01) |
| C09B 67/00 | (2006.01) |
| C09B 67/54 | (2006.01) |

(52) U.S. Cl.
CPC .............. C09B 61/00 (2013.01); A23L 5/42 (2016.08); C09B 67/0096 (2013.01)

(58) Field of Classification Search
CPC ........ C09B 61/00; C09B 67/0096; A23L 5/42
See application file for complete search history.

(56) References Cited

U.S. PATENT DOCUMENTS

| 4,247,698 | A | * | 1/1981 | Toyama | ............... | C07D 311/94 |
| | | | | | | 536/18.1 |
| 4,552,863 | A | | 11/1985 | Fujimori | | |
| 2012/0172216 | A1 | * | 7/2012 | Bohringer | ............... | A61K 33/44 |
| | | | | | | 502/416 |

FOREIGN PATENT DOCUMENTS

| CN | 101343297 A | 1/2009 |
| CN | 101880300 | 11/2010 |
| CN | 102311980 | 1/2012 |
| CN | 102448327 A | 5/2012 |
| CN | 103087129 A | 5/2013 |
| JP | S5253934 | 4/1977 |
| JP | S57151657 | 9/1982 |
| JP | S57155259 | 9/1982 |
| JP | S59164611 | 9/1984 |
| JP | S6147167 | 3/1986 |
| JP | S61296070 | 12/1986 |
| JP | H0559296 | 3/1993 |
| JP | 2002155220 | 5/2002 |
| JP | 2004131633 | 4/2004 |
| KR | 20010096213 | 11/2001 |
| KR | 20100039991 A | 4/2010 |
| WO | 2009120579 A1 | 10/2009 |
| WO | 2010105320 A1 | 9/2010 |
| WO | 2011093294 | 8/2011 |

OTHER PUBLICATIONS

El Qada et al. "Adsorption of Methylene Blue Onto activated carbon produced from steam activated bituminous coal: A study of equilibrium adsorption isotherm" Chemical Engineering Journal 124 (2006) 103-110.*
Zhou (Simple and Effective large-scale preparation of geniposide from fruit of *Gardenia jasminoides* Ellis using a liquid-liquid two-phase extraction. Fitoterapia 83 (2012) 1558-1561.*
Office Action dated Jul. 17, 2018, issued in the corresponding Chinese patent application No. 201580058508.X, with English translation.
Liang et al., Lishizhen Medicine and Materia Medica Research 2006, vol. 17, No. 1, pp. 26-28, with English abstract.
Extended European Search Report dated Jul. 16, 2018, issued in the corresponding European patent application No. 15853937.9.
Zhou et al., "Simple and effective large-scale preparation of geniposide from fruit of *Gardenia jasminoides* Ellis using a liquid—liquid two-phase extraction", Fitoterapia, 2012, vol. 83, No. 8, p. 1558-1561, 4 pages.
Paik et al., "Physical Stability of the Blue Pigments Formed from Geniposide of Gardenia Fruits: Effects of pH, Temperature, and Light", J. Agric. Food Chem., 2001, vol. 49, No. 1, p. 430-432, 3 pages.
Takeda et al., "Studies on Monoterpene Glucosides and Related Natural Products. XXXIV. Two Further New Glucosides from the Fruit of *Gardenia jasminoides* ELLIS forma grandiflora (LOUR.) MAKINO", Chemical and Pharmaceutical Bulletin, 1976, vol. 24, No. 11, p. 2644-2646, 3 pages.
Yamano et al., "Hepatotoxicity of geniposide in rats", Food and Chemical Toxicology vol. 28, No. 7, 1990, p. 515-519, 5 pages.
Uematsu et al., "Survey of geniposide in gardenia color preparations", Journal of the Food Hygienics Society of Japan, 1997, vol. 39, No. 1, p. 46-50, with partial translation, total 6 pages.

(Continued)

*Primary Examiner* — Amina S Khan
(74) *Attorney, Agent, or Firm* — Hamre, Schumann, Mueller & Larson, P.C.

(57) ABSTRACT

An object of the present invention is to provide a method for removing geniposide or genipin or both from a material containing geniposide or genipin or both. The present invention is a method for removing geniposide or genipin or both from a material containing geniposide or genipin or both, the method comprising treating the material containing geniposide or genipin or both using an activated carbon having (a) a methylene blue adsorption ability of 50 ml/g or more; and (b) an iodine adsorption ability of 750 mg/g or more, thereby removing geniposide or genipin or both.

8 Claims, 4 Drawing Sheets

(56) References Cited

OTHER PUBLICATIONS

Third party observation of PCT/JP2015/080826, dated Feb. 28, 2017, total 4 pages.
International Search Report (English and Japanese) and Written Opinion of international application No. PCT/JP2015/080826, dated Jan. 26, 2016, total 13 pages.
Kamimura, M. et al., "Chromatographic Separation and Determination of Geniposide in Commercial Gardenia Fruit Extract Color," Shokueishi, 1984, vol. 25, No. 6, pp. 517-524.
Office Action issued for Japanese patent application No. 2016-556683, dated Oct. 23, 2019, 15 pages including English translation.

* cited by examiner

METHOD FOR REMOVING GENIPOSIDE OR GENIPIN OR BOTH

TECHNICAL FIELD

The present invention relates to a method for removing geniposide or genipin or both.

BACKGROUND ART

Gardenia-derived edible dyes: gardenia blue, gardenia red, and gardenia yellow have hitherto been used.

"Gardenia blue" is generally obtained by subjecting an iridoid glucoside (whose major component is geniposide), obtained by extraction from gardenia fruits (*Gardenia augusta* Merrill var. *grandiflora* Hort., *Gardenia jasminoides* Ellis) of the family Rubiaceae, to a β-glucosidase treatment in the presence of a proteolytic product or the like. Geniposide is converted into genipin (aglycone) by a β-glucosidase treatment, and genipin is reacted with a proteolytic product or the like, thereby generating a gardenia blue colorant component (coloring principle).

Therefore, generally, "gardenia blue" is not a single compound, but a mixture. "Gardenia blue" generally contains raw material-derived unreacted geniposide or genipin or both. To the best of the Applicant's knowledge, a method for highly removing geniposide and genipin from gardenia blue has not been established; therefore, geniposide or genipin or both are contained even in purified gardenia blue.

"Gardenia red" is generally obtained by subjecting an ester hydrolysate (whose major component is geniposidic acid, which is a hydrolysate of geniposide) of an iridoid glucoside (whose major component is geniposide), obtained by extraction from gardenia fruits of the family Rubiaceae, to a β-glucosidase treatment in the presence of a proteolytic product.

Therefore, generally, "gardenia red" is not a single compound, but a mixture. "Gardenia red" generally contains raw material-derived unreacted geniposide, genipin generated from the unreacted geniposide, or both. To the best of the Applicant's knowledge, a method for highly removing geniposide and genipin from gardenia red has not been established; therefore, geniposide or genipin or both are contained even in purified gardenia red.

"Gardenia yellow" is generally obtained by aqueous extraction or hydrous ethanol extraction of gardenia fruits of the family Rubiaceae. The major colorant components of "gardenia yellow" are crocin and crocetin.

Therefore, "gardenia yellow" is also not a single compound, and generally contains raw material-derived geniposide.

Genipap (*Genipa americana* L.) juice (also known as huito juice) or its extract, which has been widely used for beverages and food, also contains genipin.

As in these examples, foods and food additives containing geniposide or genipin have hitherto been used without major problems.

However, Non-patent Document 1 discloses that oral administration of a large amount of geniposide to rat induced hepatotoxicity, and that the expression of the toxicity may be relevant to genipin generated by intestinal bacteria β-glucosidase in rat.

Further, intake of food or beverage containing genipin such as genipap juice poses a problem such that the genipin bonds to a protein in the skin around the mouth, thereby turning the skin around the mouth blue.

Regarding geniposide removal, Patent Document 1 discloses a technique of selectively adsorbing crocin, which is a colorant component of gardenia yellow, to a specific synthetic adsorption resin; this thereby removes an iridoid glucoside containing, as a major component, geniposide, which causes discoloration of gardenia yellow into green.

Patent Document 1 further discloses that it is not possible to separate geniposide from the colorant component of gardenia yellow by an activated carbon treatment, since activated carbon non-selectively adsorbs both the colorant component of gardenia yellow and geniposide.

CITATION LIST

Patent Documents

Patent Document 1: JPS57-151657A

Non-Patent Documents

Non-patent Document 1: Yamano, T. et al., Food Chem Toxicol., 28, p. 515-519 (1990)

SUMMARY OF INVENTION

Technical Problem

Gardenia-derived colorants, genipap juice, and genipap extract have hitherto been generally used; it is not known that a small amount of geniposide or genipin contained in them have negative effects on humans. However, considering the circumstances described above, if a method for removing geniposide or genipin or both from a composition containing geniposide or genipin or both is provided, such a method would be considered useful.

However, there are only few examples of a technique of removing geniposide or genipin or both from a composition containing geniposide or genipin or both. To the best of the Applicant's knowledge, the technique disclosed in Patent Document 1 is the only example.

The principle of the technique disclosed in Patent Document 1 is selective adsorption of crocin, which is the colorant component of gardenia yellow; this technique can only be used for gardenia yellow.

Therefore, an object of the present invention is to provide a new method for removing geniposide or genipin or both from a composition containing geniposide or genipin or both.

Solution to Problem

In order to attain the above object, the inventors of the present invention attempted removing geniposide or genipin or both from a composition containing geniposide or genipin or both by using various methods commonly used as colorant purification methods; however, at first, the inventors could not find an effective method (in this specification, Reference Examples 1 and 2 show test results of a resin treatment, acid precipitation, and base precipitation).

However, the inventors of the present invention conducted extensive research, and found that by treating a composition containing geniposide or genipin or both using a specific activated carbon, more specifically, an activated carbon having (a) a methylene blue adsorption ability of 50 ml/g or more, and (b) an iodine adsorption ability of 750 mg/g or more, it is possible to remove geniposide or genipin or both from the composition while preventing the loss of useful components such as the colorant component of gardenia blue and the colorant component of gardenia yellow. This is a very surprising discovery because, as described above, it was generally understood to be impossible to separate geniposide from the colorant component of gardenia yellow by an activated carbon treatment (Patent Document 1).

The inventors conducted further research based on this finding, and completed the present invention.

The present invention includes the following aspects.

Item 1. A method for removing geniposide or genipin or both from a material containing geniposide or genipin or both,
the method comprising treating the material containing geniposide or genipin or both using an activated carbon having:
  (a) a methylene blue adsorption ability of 50 ml/g or more; and
  (b) an iodine adsorption ability of 750 mg/g or more, thereby removing geniposide or genipin or both.

Item 2. A method for producing a gardenia-derived colorant in which the total content of geniposide and genipin is reduced,
the method comprising the step of removing geniposide or genipin or both from a gardenia-derived colorant containing geniposide or genipin or both using the method of Item 1.

Item 3. The method according to Item 2, wherein the gardenia-derived colorant is gardenia blue, gardenia red, or gardenia yellow.

Item 4. A colorant preparation comprising the gardenia-derived colorant of Item 2 or 3.

Item 5. A color composition comprising the gardenia-derived colorant of Item 2 or 3.

Item 6. A method for producing a genipap juice or a genipap extract in which the total content of geniposide and genipin is reduced,
the method comprising the step of removing genipin from a genipap juice or a genipap extract containing genipin using the method of item 1.

Item 7. A gardenia blue-containing composition having a total content of geniposide and genipin of 300 ppm or less based on a color value of 100.

Advantageous Effects of Invention

The present invention makes it possible to remove geniposide or genipin or both from a material containing geniposide or genipin or both.

DESCRIPTION OF EMBODIMENTS

Terms

Figure 1:
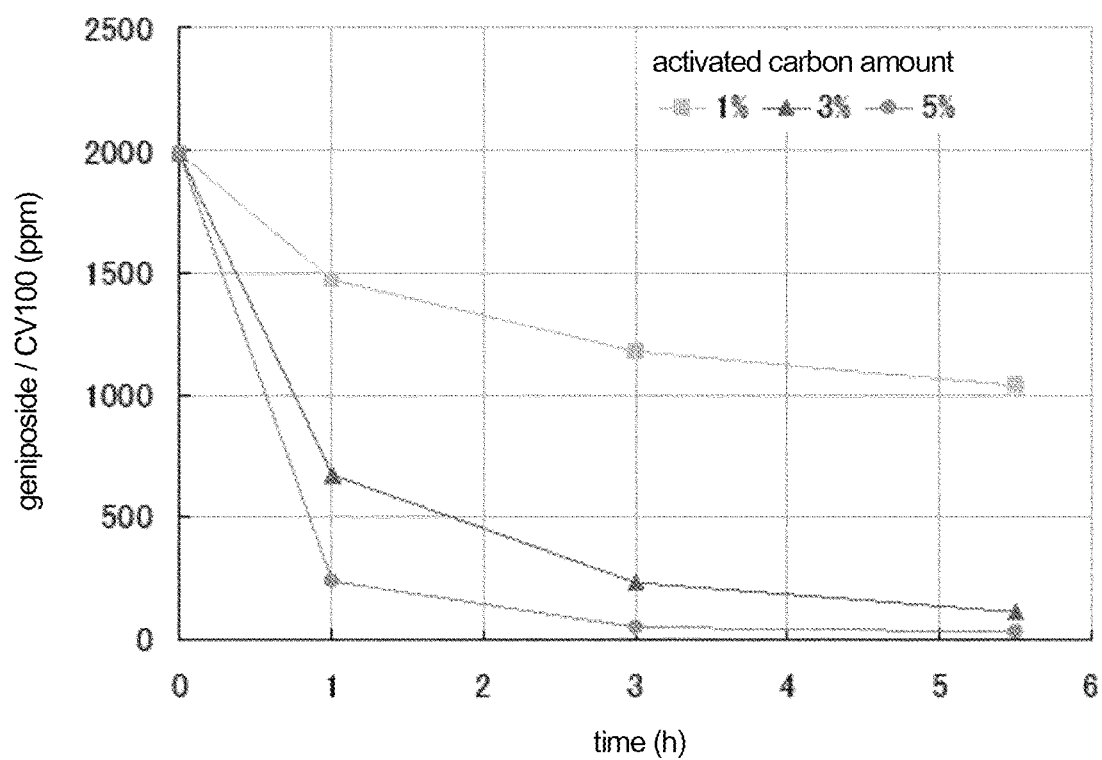
FIG. 1 is a graph showing geniposide content based on a color value of 100 relative to activated carbon treatment time (Test Example 3, Activated carbon No. 7).

In this specification, "color value" means "$E_{1cm}^{10\%}$," unless otherwise specified. Further, in this specification, the "color value" is determined according to the method disclosed in Japan's Specifications and Standards for Food Additives, 8th Edition (Japan Ministry of Health, Labour and Welfare), unless otherwise specified.

In this specification, "based on a color value of 100" means conversion of a value, such as a measurement value, into a value per 100 color value of the target material, colorant, or the like. For example, when the content of geniposide or genipin or both in a material having a color value of 200 is 500 ppm, the content of geniposide or genipin or both based on a color value of 100 is determined to be 250 ppm, which is found by multiplying 500 ppm by the color value ratio (100/200). Although it may be obvious, for example, a measurement value of a sample having a color value of 100 can be directly regarded as a value "based on a color value of 100."

In this specification, unless otherwise specified, the "room temperature" or "normal temperature" means a temperature within a range of 10 to 40° C.

In this specification, a "colorant component" means a coloring principle.

In this specification, the "colorant" contains a colorant component or consists only of a colorant component, or may be a mixture of a plurality of colorant components (compounds); further, the "colorant" may contain a raw material-derived component other than a colorant component, a component attributable to the production method, or both. In this specification, the "colorant" is preferably a colorant derived from a natural product. Further, in this specification, the "colorant" can mean an unpurified or roughly purified colorant (or a colorant-containing material), or a purified colorant. This can be judged by the context.

"Gardenia blue" is defined as follows in Japan's Specifications and Standards for Food Additives, 8th Edition (Japan Ministry of Health, Labour and Welfare). In this specification, the "gardenia blue" may be those in accordance with this definition.

Definition: "this product is obtained by adding β-glucosidase to a mixture of an iridoid glucoside obtained from the fruit of gardenia (*Gardenia augusta* Merrill or *Gardenia jasminoides* Ellis) and a proteolytic product, and may contain dextrin or lactose."

"Gardenia red" is defined as follows in Japan's Specifications and Standards for Food Additives, 8th Edition (Japan Ministry of Health, Labour and Welfare). In this specification, the "gardenia red" may be those in accordance with this definition.

Definition: "this product is obtained by adding β-glucosidase to a mixture of an ester hydrolysate of an iridoid glucoside obtained from the fruit of gardenia (*Gardenia augusta* Merrill or *Gardenia jasminoides* Ellis) and a proteolytic product, and may contain dextrin or lactose."

"Gardenia yellow" is defined as follows in Japan's Specifications and Standards of Food Additives, 8th Edition (Japan Ministry of Health, Labour and Welfare). In this specification, the "gardenia yellow" may be those in accordance with this definition.

Definition: "this product contains, as major components, crocin and crocetin obtained from the fruit of gardenia (*Gardenia augusta* Merrill or *Gardenia jasminoides* Ellis), and may contain dextrin or lactose."

Method for Removing Geniposide or Genipin or Both from Material Containing Geniposide or Genipin or Both The method for removing geniposide or genipin or both from a material containing geniposide or genipin or both of the present invention (hereinafter may also be referred to as a removal method of the present invention) is a method comprising treating a material containing geniposide or genipin or both with an activated carbon having (a) a methylene blue adsorption ability of 50 ml/g or more, and (b) an iodine adsorption ability of 750 mg/g or more, thereby removing geniposide or genipin or both from the material.

In the present invention, "removal" means complete removal or partial removal. More specifically, although incomplete removal of geniposide or genipin or both is regarded as one of the embodiments of the present invention, it is preferable to remove geniposide or genipin or both completely or almost completely.

Materials

The amount of the "geniposide or genipin or both" in the "material containing geniposide or genipin or both" to be subjected to the removal method of the present invention is not particularly limited, and may be any desired amount to be removed.

The lower limit of the amount is, for example, as the total content of geniposide and genipin, 0.02 w/w %, 0.03 w/w %, or 0.04 w/w %, based on the total solids content of the material.

The upper limit of the amount is, for example, as the total content of geniposide and genipin, 2 w/w %, 1.2 w/w %, or 0.6 w/w %, based on the total solids content of the material.

The amount is, for example, as the total content of geniposide and genipin, in a range of 0.02 to 2 w/w %, in a range of 0.03 to 1.2 w/w %, or in a range of 0.04 to 0.6 w/w %, based on the total solids content of the material.

When the material is a colorant, the lower limit of the amount is, for example, as the total content of geniposide and genipin, 350 ppm, 500 ppm, or 700 ppm, based on a color value of 100.

When the material is a colorant, the upper limit of the amount is, for example, as the total content of geniposide and genipin, 5000 ppm, 3000 ppm, or 2000 ppm, based on a color value of 100.

When the material is a colorant, the amount is, for example, as the total content of geniposide and genipin, in a range of 350 to 5000 ppm, in a range of 500 to 3000 ppm, or in the range of 700 to 2000 ppm, based on a color value of 100.

In this specification, the amounts of geniposide and genipin are determined by HPLC analysis under the conditions specified below, or an analytical method capable of obtaining results equivalent to the results of HPLC.

Conditions of HPLC Analysis
System: JASCO HPLC system
Column: Symmetry C18 (4.6 mm I.D.×250 mm, Waters)
Mobile phase: a) water, b) acetonitrile (b. 12% in 8 min., 12-15% in 2 min., 15% in 10 min., 15-100% in 5 min., 100% in 10 min.)
Flow rate: 1.0 mL/min.
Temperature: 40° C.
Detection: UV-Vis detector 238 nm
Injection Amount: 20 μL In the analysis under these analysis conditions, the detection limit of geniposide is about 1 ppm, and the detection limit of genipin is also about 1 ppm.

The "material containing geniposide or genipin or both" to be subjected to the removal method of the present invention is not particularly limited insofar as the material is "a material containing geniposide or genipin or both"; however, preferable examples include gardenia-derived colorants such as gardenia blue, gardenia red, or gardenia yellow, and a genipap juice or extract.

The "gardenia blue" to be subjected to the removal method of the present invention is not particularly limited insofar as it is gardenia blue containing geniposide or genipin or both. Examples include gardenia blue produced by a known production method and gardenia blue that can be commercially obtained.

As described above, "gardenia blue" is generally obtained by subjecting an iridoid glucoside (whose major component is geniposide) obtained by extraction from gardenia fruit of the family Rubiaceae (*Gardenia augusta* Merrill, or *Gardenia jasminoides* Ellis) (this may simply be referred to as "gardenia" in this specification) to a β-glucosidase treatment in the presence of a proteolytic product. In this step, geniposide is converted into genipin (aglycone) by the β-glucosidase treatment, and the generated genipin is reacted with a proteolytic product, thereby generating a gardenia blue colorant component.

Therefore, generally, "gardenia blue" is not a single compound, but a mixture. "Gardenia blue" generally contains raw material-derived unreacted geniposide or genipin or both.

The amount of the "geniposide or genipin or both" contained in "gardenia blue" to be subjected to the removal method of the present invention is not particularly limited; however, the amount is, as the total content of geniposide and genipin, preferably in a range of 350 to 5000 ppm, more preferably in a range of 500 to 3000 ppm, further preferably in a range of 700 to 2000 ppm, based on a color value of 100. The color value of gardenia blue is determined by a color value measurement method using a citrate buffer solution (pH=7.0) as a measurement solvent and a maximum absorption wavelength of 570 to 610 nm.

The "gardenia red" to be subjected to the removal method of the present invention is not particularly limited insofar as it is gardenia red containing geniposide. Examples include gardenia red produced by a known production method and gardenia red that can be commercially obtained.

As described above, the "gardenia red" is generally obtained by subjecting an ester hydrolysate (whose major component is geniposidic acid, which is a hydrolysate of geniposide) of an iridoid glucoside (whose major component is geniposide) obtained by extraction from gardenia fruits of the family Rubiaceae to a β-glucosidase treatment in the presence of a proteolytic product.

Therefore, generally, "gardenia red" is not a single compound, but a mixture. "Gardenia red" generally contains raw material-derived unreacted geniposide, genipin generated from the unreacted geniposide, or both.

The amount of "geniposide or genipin or both" contained in "gardenia red" to be subjected to the removal method of the present invention is not particularly limited; however, the amount is, as the total content of geniposide and genipin, preferably in a range of 350 to 5000 ppm, more preferably in a range of 500 to 3000 ppm, further preferably in a range of 700 to 2000 ppm based on a color value of 100. The color value of gardenia red is determined by a color value measurement method using an acetate buffer solution (pH=4.0) as a measurement solvent and a maximum absorption wavelength of 520 to 545 nm.

As described above, gardenia yellow is generally obtained by aqueous extraction or hydrous ethanol extraction of gardenia fruits of the family Rubiaceae.

Therefore, gardenia yellow also generally contains raw material-derived geniposide.

The amount of "geniposide" contained in "gardenia yellow" to be subjected to the removal method of the present invention is not particularly limited; however, the amount is, as the total content of geniposide and genipin, preferably in a range of 350 to 5000 ppm, more preferably in a range of 500 to 3000 ppm, further preferably in a range of 700 to 2000 ppm, based on a color value of 100. For gardenia yellow, "the total content of geniposide and genipin" is generally equal to the geniposide content. The color value of gardenia yellow is determined by the following color value measurement method.

Gardenia Yellow Color Value Measurement Method

About 5 g of a sample based on a color value of 100 is precisely weighed, and 50 ml of a 0.02 mol/L sodium hydroxide solution is added to the sample. The mixture is heated for 20 minutes in a 50° C. water bath. As necessary, the mixture is shaken for dissolution, and water is added to make the amount precisely 100 ml. 1 ml of the resulting solution is precisely weighed and 50 vol % ethanol is added to make the amount precisely 100 ml, followed by, as necessary, centrifugation. The resulting supernatant is used as the test liquid. Absorbency A is measured at a maximum absorption wavelength of 410 to 425 nm and at a liquid layer length of 1 cm, and the color value is determined according to the formula below. A 50 vol % ethanol is used as a control.

Color value=($A$×1000)/collection amount (g)

The amount of "genipin" contained in the genipap (*Genipa americana* L.) juice (also known as huito juice) or extract to be subjected to the removal method of the present invention is not particularly limited. For example, the amount may be the amount of "genipin" contained in the general huito juice or a genipap extract. The amount as the total content of geniposide and genipin is preferably in a range of 0.02 to 0.20 w/w %, more preferably in a range of 0.03 to 0.12 w/w %, further preferably in a range of 0.04 to 0.08 w/w %. For genipap juice or genipap extract, "the total content of geniposide and genipin" is generally equal to the genipin content.

Treatment Using Activated Carbon

The activated carbon used in the removal method of the present invention is an activated carbon having (a) a methylene blue adsorption ability of 50 ml/g or more, and (b) an iodine adsorption ability of 750 mg/g or more.

The methylene blue adsorption ability of the activated carbon used in the removal method of the present invention is 50 ml/g or more, preferably 80 ml/g or more, more preferably 100 ml/g or more, further preferably 120 ml/g or more, further more preferably 150 ml/g or more.

The upper limit of the methylene blue adsorption ability of the activated carbon used in the removal method of the present invention is not particularly limited; however, the methylene blue adsorption ability is, for example, generally 1000 ml/g or less, 700 ml/g or less, or 500 ml/g or less.

The iodine adsorption ability of the activated carbon used in the removal method of the present invention is 750 mg/g or more, preferably 850 mg/g or more, more preferably 1000 mg/g or more.

The upper limit of the iodine adsorption ability of the activated carbon used in the removal method of the present invention is not particularly limited; however, the iodine adsorption ability is, for example, generally 4000 mg/g or less, 3000 mg/g or less, or 2500 mg/g or less.

With these values of methylene blue adsorption ability and iodine adsorption ability, geniposide or genipin or both may be highly removed.

The methylene blue adsorption ability of the activated carbon used in the removal method of the present invention is determined by the method according to the "methylene blue adsorption ability" of JIS K 1474:2014.

The iodine adsorption ability of the activated carbon used in the removal method of the present invention is determined by the method according to the "iodine adsorption ability" of JIS K 1474:2014.

The upper limit of the "pore volume" of the activated carbon used in the removal method of the present invention is preferably 1.4 ml/g, more preferably 1.3 ml/g, further preferably 1.2 ml/g, further more preferably 1.1 ml/g, particularly preferably 1 ml/g.

With such a range of pore volume, it is possible to selectively remove "geniposide or genipin or both," while preventing the loss of the useful components, such as the colorant component of gardenia blue.

The lower limit of the pore volume of the activated carbon used in the removal method of the present invention is preferably 0.25 ml/g, more preferably 0.3 ml/g, further preferably 0.5 ml/g, further more preferably 0.6 ml/g.

With such a range of pore volume, it is possible to highly remove "geniposide or genipin or both."

The pore volume of the activated carbon used in the removal method of the present invention is preferably in a range of 0.25 to 1.4 ml/g, more preferably in a range of 0.3 to 1.3 ml/g, further preferably in a range of 0.5 to 1.2 ml/g, further more preferably in a range of 0.6 to 1.1 ml/g, particularly preferably in a range of 0.6 to 1 ml/g.

The pore volume of the activated carbon used in the removal method of the present invention is determined as follows.

The Method for Determining Pore Volume

Nitrogen gas is caused to adsorb to a sample (activated carbon) at a liquid nitrogen boiling point, i.e., −195.8° C. The nitrogen adsorption amount at an equilibrium pressure of $P/P_0$=0.931 is determined and converted into a liquid nitrogen volume, thereby determining a pore volume.

The lower limit of the "specific surface area" of the activated carbon used in the removal method of the present invention is preferably 650 $m^2$/g, more preferably 700 $m^2$/g, further preferably 900 $m^2$/g, further more preferably 1000 $m^2$/g.

With such a range of specific surface area, it is possible to selectively remove "geniposide or genipin or both," while preventing the loss of the useful components, such as the colorant component of gardenia blue.

The upper limit of the specific surface area of the activated carbon used in the removal method of the present invention is not particularly limited; however, the specific surface area is generally about 2000 $m^2$/g, preferably 1900 $m^2$/g, more preferably 1800 $m^2$/g, further preferably 1700 $m^2$/g.

The specific surface area of the activated carbon used in the removal method of the present invention is preferably in a range of 650 to 2000 $m^2$/g, more preferably in a range of 700 to 1900 $m^2$/g, further preferably in a range of 900 to 1800 $m^2$/g, further more preferably in a range of 1000 to 1700 $m^2$/g.

The specific surface area of the activated carbon used in the removal method of the present invention is determined as follows.

Method for Determining Specific Surface Area

Nitrogen gas is caused to adsorb to a sample (activated carbon) at a liquid nitrogen boiling point, i.e., −195.8° C.

The relationship between the pressure and the adsorption amount is determined under a relative pressure of 0.1 or less, and a specific surface area is determined based on the BET theory.

Since such an activated carbon is commercially available, it is possible to measure the commercially obtained activated carbons using the measurement methods described above, thereby selecting an activated carbon satisfying the above-specified parameters.

Examples of commercially available activated carbons include Kuraray coal (product name) series from Kuraray Chemical Co., Ltd.; SP series from Union Service Create Co.; Shirasagi series from Japan EnviroChemicals, Limited; Umebachi jirusi series from Taihei Chemical Industrial Co., Ltd.; and activated carbon series from Ueda Environment Solutions Co., Ltd.

The treatment using activated carbon is performed by bringing a material containing geniposide or genipin or both into contact with activated carbon. As a result, geniposide or genipin or both adsorb to the activated carbon. Further, by removing the activated carbon in which geniposide or genipin or both is adsorbed, it is possible to remove geniposide or genipin or both.

When the material containing geniposide or genipin or both is a solid, the contact of the material with activated carbon may be performed, for example, by dissolving or suspending the material in an aqueous solvent to prepare a liquid-form material, and mixing the liquid material with activated carbon. When the material containing geniposide or genipin or both is a liquid, the contact of the material with activated carbon may be performed, for example, by directly mixing the liquid material with activated carbon, or first diluting the liquid material with an aqueous solvent and then mixing it with activated carbon. The mixing may be performed by a conventional method using a shaking apparatus, a stirrer, and the like.

Examples of the aqueous solvents include water (e.g., tap water, ion-exchanged water, distilled water) and hydrous alcohol (e.g., hydrous ethanol). In terms of preventing adsorption of useful components, such as the gardenia blue colorant component, to activated carbon, the alcohol (e.g., ethanol) content in the aqueous solvent is preferably small, and the aqueous solvent is preferably water (e.g., tap water, ion-exchanged water, distilled water).

The pH of the liquid material is not particularly limited; however, the pH is generally in a range of 2.0 to 7.0, preferably in a range of 4.0 to 7.0.

When pH of the liquid material is adjusted, the adjustment may be performed by a conventional method using hydrochloric acid or sodium hydroxide.

The temperature in the treatment using activated carbon is not particularly limited; however, the treatment is generally performed at room temperature.

The appropriate amount of the activated carbon used for the activated carbon treatment varies depending on the type of material containing geniposide or genipin or both, the types and the contents of useful components in the material, the amount of geniposide and genipin or both in the material, and the like. The amount of the activated carbon in a liquid material is, for example, in a range of 0.1 to 10%, more preferably 1 to 7%. For gardenia blue having a total content of geniposide and genipin in a range of 350 to 5000 ppm per 100 color value, the amount of the activated carbon in the liquid material is preferably in a range of 1 to 10 w/w %, more preferably in a range of 2 to 8 w/w %, further preferably in a range of 3 to 7 w/w %.

The duration of the activated carbon treatment is not particularly limited; however, the duration is generally 10 minutes to 50 hours, preferably 30 minutes to 40 hours, more preferably in a range of 1 to 30 hours. During this time period, the above mixing state is preferably maintained.

If the duration is excessively short, the removal of "geniposide and genipin or both" will be insufficient; on the other hand, if the duration is excessively long, the removal ratio of "geniposide and genipin or both" will not increase, which is disadvantageous in terms of work efficiency.

Membrane Treatment

In the removal method of the present invention, the material containing geniposide or genipin or both is preferably first treated with a membrane before the activated carbon treatment is performed.

The "geniposide or genipin or both" can be removed to some extent by the membrane treatment. Thus, by conducting the membrane treatment, for example, it is possible to reduce the amount of activated carbon required in the activated carbon treatment.

The membrane used for the membrane treatment is preferably an ultrafilter membrane; more preferably, the membrane has a molecular weight cut-off in a range of 2000 to 5000. Such a membrane may be commercially obtained. The membrane treatment using an ultrafilter membrane is preferably performed, for example, for 3 to 24 hours at 0.3 to 0.7 MPa.

When the membrane treatment is performed, the "material containing geniposide or genipin or both" to be subjected to the activated carbon treatment is a concentrated liquid obtained by the membrane treatment. The concentrated liquid may be subjected to other treatments, such as dilution or concentration, as necessary, before being subjected to the activated carbon treatment.

The removal method of the present invention makes it possible to reduce the amount of geniposide or genipin or both in the material while preventing the loss of the useful components such as gardenia blue in the material.

In the removal method of the present invention, the residual ratio of geniposide and genipin in terms of the total content (i.e., the mass ratio of the total content after the treatment of the removal method of the present invention with respect to the total content before the treatment) is preferably 65% or less, more preferably 20% or less, further preferably 5% or less, further more preferably 1% or less, particularly preferably 0.5% or less, most preferably 0%.

In a preferred embodiment of the present invention in which "the material containing geniposide or genipin or both" is a gardenia-derived colorant, the residual ratio of the colorant component, i.e., a useful component (i.e., the ratio of the content of the colorant component after the treatment of the removal method of the present invention with respect to the content before the treatment), is preferably 85% or more, more preferably 90% or more, further preferably 95% or more, further more preferably 98% or more; and the residual ratio of geniposide and genipin in terms of the total content is preferably 65% or less, more preferably 20% or less, further preferably 5% or less, further more preferably 1% or less, particularly preferably 0.5% or less, most preferably 0% (including the case in which the content of geniposide and genipin in the gardenia-derived colorant after the treatment of the removal method of the present invention is less than the detection limit, and the residual ratio is thus regarded as 0%).

Examples of colorant components include gardenia blue components, gardenia red components, and gardenia yellow components.

In a particularly preferred embodiment of the present invention, the colorant component is a gardenia blue component.

The content of the colorant component is determined based on the color value. Therefore, "a residual ratio of colorant component" may be regarded as "a residual ratio of color value."

The "residual ratio of color value" is defined as follows.

Residual ratio of color value (%)=(color value after the treatment of the removal method of the present invention)/(color value before the treatment of the removal method of the present invention)×100

Method for Producing Gardenia-Derived Colorant in Which Total Content of Geniposide and Genipin is Reduced The removal method of the present invention described above removes geniposide or genipin or both from a gardenia-derived colorant containing geniposide or genipin or both, thereby producing a gardenia-derived colorant in which the total content of geniposide and genipin is reduced. More specifically, an embodiment of the present invention is a method for producing a gardenia-derived colorant in which the total content of geniposide and genipin is reduced.

Examples of the gardenia-derived colorants include gardenia blue, gardenia red, and gardenia yellow.

The expression "reduced" means reduction in the total content of geniposide and genipin in the material, and may mean that the material is free of, or substantially free of, geniposide and genipin.

In the production method of the present invention, the solution obtained after the treatment with activated carbon may be further subjected to a conventional purification treatment such as, filtration, resin treatment, or membrane treatment.

Gardenia-Derived Colorant, Gardenia-Derived Colorant Preparation, Gardenia-Derived Colorant Color Composition The gardenia-derived colorant obtained by the production method of the present invention may be in the form of a solution obtained after the activated carbon treatment, a concentrate thereof, or in the form of powder obtained by drying the solution in an arbitrary method (e.g., vacuum drying, freeze-drying, spray-drying, or the like).

The amount of the "geniposide or genipin or both" in the gardenia-derived colorant obtained by the production method of the present invention is, as the total content of geniposide and genipin, preferably 300 ppm or less, more preferably 200 ppm or less, further preferably 100 ppm or less, further more preferably 50 ppm or less, particularly preferably 20 ppm or less, more particularly preferably 10 ppm or less, further particularly preferably 5 ppm or less, further more particularly preferably 1 ppm or less, based on a color value of 100.

The amount of the "geniposide or genipin or both" is preferably maximally reduced. In particular, the amount is preferably reduced to be less than the measurement limit in the measurement method described above. Therefore, the lower limit of the amount is not limited. However, for example, an amount of 1 ppm or more, 2 ppm or more, or 5 ppm or more in the gardenia-derived colorant is acceptable depending on the purpose and the form of use.

An embodiment of the present invention is gardenia blue having a total content of geniposide and genipin based on a color value of 100 of 300 ppm or less (more preferably 200 ppm, further preferably 100 ppm or less, further more preferably 50 ppm or less, particularly preferably 10 ppm or less, further particularly preferably 5 ppm or less, more further particularly preferably 1 ppm or less, most preferably 0 ppm (or less than the detection limit in the measurement method described above)). The gardenia blue may be obtained by the production method of the present invention described above.

The gardenia-derived colorant obtained by the production method of the present invention and the gardenia blue of the present invention may be used in a manner similar to that of the previously known gardenia-derived colorants, and may be provided as a colorant preparation either as is or after being mixed with other components such as a diluent, a carrier, or other additives.

Examples of diluents, carriers, and additives include various general components used for a colorant preparation, in particular, a water-soluble colorant preparation, insofar as the advantageous effects of the prevent invention are not impaired.

Examples include sucrose, lactose, glucose, dextrin, gum arabic, water, ethanol, propylene glycol, glycerin, and starch syrup.

The colorant preparation may be prepared into an arbitrary form, such as, but not particularly limited to, powder, granules, tablet, liquid, emulsion, or paste.

The colorant preparation of the present invention may be widely used as colorants for food, perfumery and cosmetics, pharmaceuticals, quasi-drugs, feedstuff, and the like in a manner similar to that of the previously known gardenia-derived colorant preparations.

The present invention provides a color composition, such as food, perfumery and cosmetics, pharmaceuticals, quasi-drugs, or feedstuff, that is colored by using the gardenia-derived colorant described above or the colorant preparation thereof.

Examples of food include confectioneries such as frozen dessert, fresh cakes, Japanese confectioneries, or western confectioneries; beverages such as beverages and alcohol beverages; farm-processed products such as dehydrated vegetables or pickles; processed seafood; and processed meat.

Examples of the perfumery and cosmetics include cosmetics (e.g., eye shadow, mascara, lipstick, lip balm, lotion, or the like), soap, shampoo, conditioner, detergent, toothpaste, and mouthwash.

Examples of pharmaceuticals include tablets (e.g., sugar-coated tablets), granules, liquids, and capsules.

The content of the gardenia-derived colorant in these color compositions is not particularly limited; however, for example, the content of gardenia blue is generally set so that the absorbency of the color composition is 0.01 to at the maximum absorption wavelength, which is about 605 nm.

Method for Producing Genipap Juice or Genipap Extract in Which Genipin Content is Reduced The removal method of the present invention described above is capable of removing genipin from a genipap juice or extract containing genipin (as stated above, a genipap juice or extract generally contains genipin), thereby producing a genipap juice or extract in which the genipin content is reduced. More specifically, an embodiment of the present invention is a method for producing a genipap juice or extract in which the genipin content is reduced.

The expression "reduced" means reduction in the total content of geniposide and genipin in the material, and may mean that the material is free of, or substantially free of geniposide and genipin.

The "genipap juice or extract in which the genipin content is reduced" obtained by the "method for removing geniposide or genipin or both from a material containing geniposide or genipin or both" described above may be used in a manner similar to that of the previously known genipap juice or extract either as is or after being subjected to purifications, processing, and the like as desired.

EXAMPLES

The present invention is described in more detail below with reference to Examples. However, the present invention is not limited to the Examples.

Each symbol and abbreviation stands for the following. Aside from these symbols and abbreviations, symbols and abbreviations generally used in the related technical field are used in this specification.
CV: Color Value Regarding "the total content of geniposide and genipin" or the like in the description below, "geniposide and genipin" may be referred to as "Total G."

For example, "Total G residual ratio" is defined as follows.

Total $G$ residual ratio (%)=(geniposide amount after treatment+genipin amount after treatment)/(geniposide amount before treatment+genipin amount before treatment)×100

In the Test Examples and the Examples below, quantitative determinations of geniposide and genipin were performed by HPLC analysis under the following conditions.

When an analysis sample having a color value over 100 was used in this analysis, the analysis sample was diluted with ultrapure water so as to adjust the color value to 100.
Conditions of HPLC Analysis
System: JASCO HPLC System
Column: Symmetry C18 (4.6 mm I.D.×250 mm, Waters)
Mobile phase: a) water, b) acetonitrile (b. 12% in 8 min., 12-15% in 2 min., 15% in 10 min., 15-100% in 5 min., 100% in 10 min.)
Flow rate: 1.0 mL/min.
Temperature: 40° C.
Detection: UV-Vis detector 238 nm
Injection amount: 20 μL In the analysis under the above conditions, if geniposide or genipin was not detected (i.e., if the value was less than the detection limit), the geniposide concentration or the genipin concentration in the calculation of the total content of geniposide and genipin were regarded as 0 ppm.

Test Example 1

Geniposide Adsorption Test Using Various Activated Carbons

Geniposide adsorption tests were performed using various activated carbons (activated carbon Nos. 1 to 16). These activated carbons were obtained from commercial suppliers. Activated carbons No. 5 and No. 6 were the same product, with different lot numbers.

Each activated carbon was added to a solution of about 500 ppm geniposide at a ratio of 1 w/w %. After 1-hour shaking, the geniposide content was measured under the HPLC analysis conditions detailed above.

Table 1 shows the results. In Table 1, the "control" was not treated with activated carbon, and "ND" means less than the detection limit.

As shown in Table 1, the geniposide adsorption ability significantly varied depending on the type of activated carbon.

TABLE 1

| Activated Carbon No. | Geniposide Concentration (ppm) | Geniposide Residual Ratio (%) |
|---|---|---|
| Control | 509.2 | 100.0 |
| 1 | 2.2 | 0.4 |
| 2 | 2.2 | 0.4 |
| 3 | 6.4 | 1.3 |
| 4 | 4.6 | 0.9 |
| 5 | 2.3 | 0.5 |
| 6 | 2.3 | 0.4 |
| 7 | 2.6 | 0.5 |
| 8 | 463.7 | 91.1 |
| 9 | ND | 0 |
| 10 | 362.6 | 71.2 |
| 11 | ND | 0 |
| 12 | 479.4 | 94.1 |
| 13 | 2.8 | 0.5 |
| 14 | 2.1 | 0.4 |
| 15 | 11.3 | 2.2 |
| 16 | 2.4 | 0.5 |

Test Example 2

Geniposide Adsorption Test in the Presence of Gardenia Blue

Nine kinds of activated carbons (activated carbon Nos. 4, 6, 7, 9, 11, 13, 14, 15, and 16) were selected from the activated carbons that were confirmed to have high geniposide adsorption ability in Test Example 1, and a geniposide and genipin adsorption test was performed using these activated carbons in the presence of gardenia blue for the consideration of their actual ability to remove geniposide and genipin from gardenia blue. Since genipin was not detected from the gardenia blue used in this test, this test actually confirmed the geniposide adsorption to activated carbon. However, since genipin is similar to geniposide in its structure and physicochemical property, genipin is reasonably assumed to behave similarly to geniposide in the Test Examples and the Examples.

β-glucosidase was caused to act on purified geniposide (geniposide content=91705 ppm) derived from a gardenia fruit in the presence of a protein hydrolysate, thereby obtaining gardenia blue (geniposide content=1372 ppm, genipin content=less than the detection limit). Purified geniposide (geniposide content=34.8 w/w %, genipin content=less than the detection limit) derived from a gardenia fruit was added to the resulting gardenia blue so that the geniposide content was about 2000 ppm, thereby preparing geniposide-containing gardenia blue. Each activated carbon was added the resulting geniposide-containing gardenia blue (specifically, 0.2 g of activated carbon was added to 20 g of geniposide-containing gardenia blue (this colorant was made into a solution adjusted with water to have a color value of 100)) at a ratio of 1 w/w %, and the mixture was shaken at normal temperature. After an hour, the color value and the geniposide content were measured.

Table 2 shows the results. In Table 2, the "control" was not treated with activated carbon.

As shown in Table 2, the geniposide adsorption ability and the color value adsorption ability varied depending on the type of activated carbon, and the geniposide content calculated based on a color value of 100 (geniposide/CV100) also varied. However, some activated carbons selectively adsorbed geniposide in the gardenia blue. It was thus suggested that these activated carbons may ensure a high color value residual ratio and high geniposide removal at the same time.

TABLE 2

| Activated Carbon No. | Geniposide Concentration (ppm) | Genipin Concentration (ppm) | Geniposide Residual Ratio (%) | Total G Residual Ratio (%) | Color Value | Color Value Residual Ratio (%) | Geniposide/CV100 (ppm) | Total G/CV100 (ppm) |
|---|---|---|---|---|---|---|---|---|
| Control | 2047.9 | ND | 100.0 | 100.0 | 101.2 | 100.0 | 2024 | 2024 |
| 4 | 1438.0 | ND | 70.2 | 70.2 | 97.8 | 96.6 | 1470 | 1470 |
| 6 | 1643.1 | ND | 80.2 | 80.2 | 96.4 | 95.3 | 1704 | 1704 |
| 7 | 1283.6 | ND | 62.7 | 62.7 | 100.6 | 99.4 | 1276 | 1276 |
| 9 | 1131.4 | ND | 55.2 | 55.2 | 101.0 | 99.8 | 1120 | 1120 |
| 11 | 1728.1 | ND | 84.4 | 84.4 | 102.3 | 101.1 | 1689 | 1689 |
| 13 | 1858.8 | ND | 90.8 | 90.8 | 101.9 | 100.7 | 1824 | 1824 |
| 14 | 1658.2 | ND | 81.0 | 81.0 | 101.6 | 100.4 | 1632 | 1632 |
| 15 | 1883.5 | ND | 92.0 | 92.0 | 98.5 | 97.3 | 1912 | 1912 |
| 16 | 1810.5 | ND | 88.4 | 88.4 | 101.2 | 100.0 | 1789 | 1789 |

Test Example 3

Consideration Regarding Amount of Activated Carbon and Activated Carbon Treatment Time Consideration regarding the amount of activated carbon and the activated carbon treatment time was performed.

Activated carbons No. 7 and No. 8 were used for the consideration. Activated carbon No. 7 was confirmed for a low geniposide content based on a color value of 100 (geniposide/CV100) in Test Example 2. Activated carbon No. 8 was confirmed for a high geniposide residual ratio in Test Example 1.

A test similar to that of Test Example 2 was performed, except that, after activated carbon No. 7 or No. 8 was added at a ratio of 1 w/w %, 3 w/w % or 5 w/w %, the mixture was stirred at normal temperature with a stirrer, and the color value and the geniposide content were measured after an hour, after 3 hours and after 5.5 hours. With these measurement values, geniposide contents based on a color value of 100 (geniposide/CV100) were calculated. FIG. 1 (activated carbon No. 7) and FIG. 2 (activated carbon No. 8) show the results.

Further, the geniposide adsorption amount (mg) of activated carbon No. 7 was measured. With the measurement value, the geniposide adsorption amount per unit mass of the activated carbon (geniposide adsorption amount (g)/per gram of activated carbon) was calculated. Table 3 shows the results.

TABLE 3

| Activated Carbon Amount | Geniposide Adsorption Amount (mg) | Geniposide Adsorption Amount (g)/1 g of Activated Carbon |
|---|---|---|
| 1 w/w % | 19.30 | 0.096 |
| 3 w/w % | 38.20 | 0.064 |
| 5 w/w % | 39.91 | 0.040 |

As shown in FIG. 1, when activated carbon No. 7 was used, after 5.5 hours, geniposide was removed to about 1000 ppm/CV100 by 1 w/w % addition, and to about 30 ppm/CV100 by 5 w/w % addition.

The maximum geniposide adsorption amount of activated carbon No. 7 is assumed to be about 0.1 g/g. The results of Table 3 revealed that it is preferable to add an excessive amount of activated carbon to ensure efficient removal. Regarding the treatment time, there was a tendency that the decrease in geniposide content based on a color value of 100 (geniposide/CV100) became moderate when the treatment time exceeded an hour.

Figure 2:
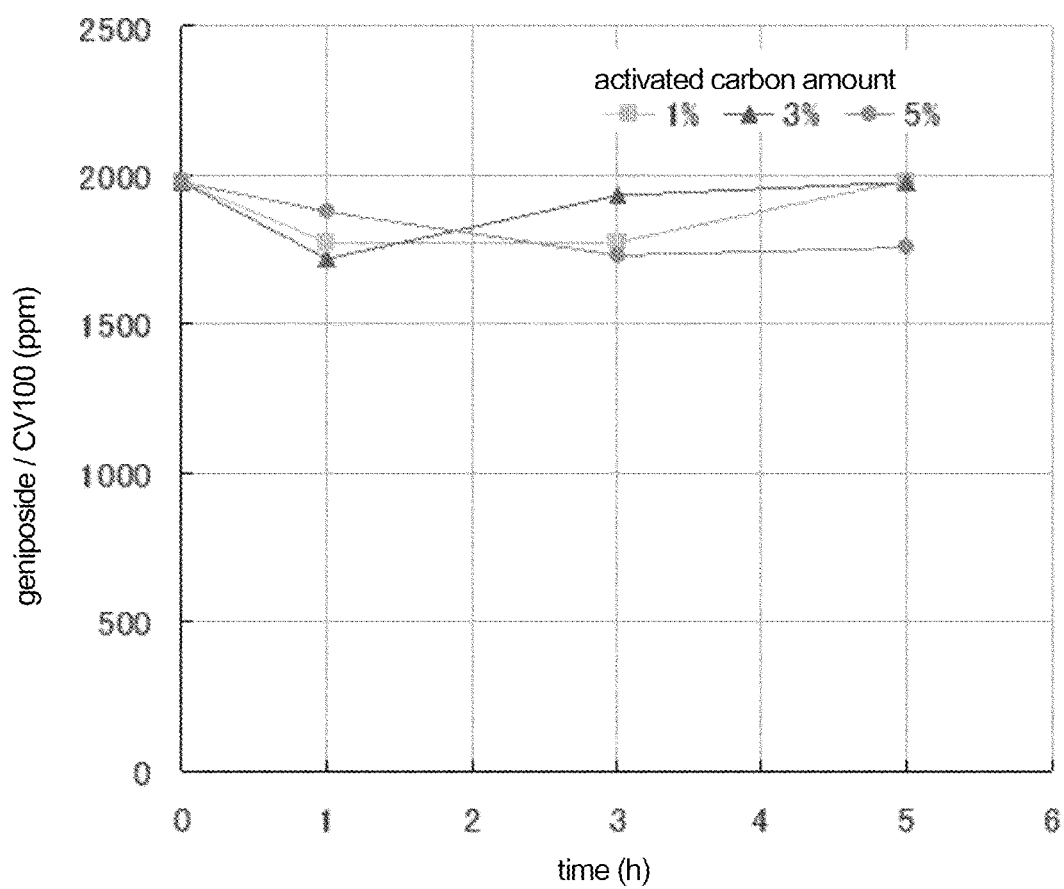
FIG. 2 is a graph showing geniposide content based on a color value of 100 relative to activated carbon treatment time (Test Example 3, Activated carbon No. 8).

In contrast, as shown in FIG. 2, when activated carbon No. 8 was used, the geniposide content based on a color value of 100 (geniposide/CV100) was not decreased by increasing the addition amount or extending the treatment time. The results revealed that the geniposide adsorption amount was not increased simply by increasing the addition amount of activated carbon and/or extending the activated carbon treatment time, and that selection of activated carbon based on appropriate factors was important.

Production Test Example 1

Production of Geniposide-Reduced Gardenia Blue 1
Step 1

β-glucosidase was caused to act on purified geniposide (geniposide content=37.5 w/w %) derived from a gardenia fruit in tap water in the presence of a protein hydrolysate, thereby preparing gardenia blue (solution state, liquid measure=2350 g, color value=113.3, geniposide content based on a color value of 100=1372 ppm, genipin content=less than the detection limit).

The obtained gardenia colorant was filtrated under the following filtration conditions, thereby obtaining gardenia blue as the filtrate (solution state, liquid measure=2606 g, color value=100.9).

Filtration Conditions
Filter Paper: ADVANTEC No. 2, ϕ125 mm (ADVANTEC)
Filtration adjuvant: diatomaceous earth
Filtration adjuvant precoating amount: 20 g
Filtration adjuvant body-feed amount: 2 w/w % of liquid measure
Step 2

The gardenia blue after the filtration using the above filter paper was treated with a ultrafilter membrane (0.5 MPa, 15 hours and 40 minutes), thereby obtaining gardenia blue (solution state, liquid measure=2448 g, color value=102.6, solids content=14.6%, color value/solids content=704.2, yield=95.5%, geniposide content based on a color value of 100=432 ppm, genipin content=less than the detection limit).

Step 3

Activated carbon No. 9 was added to the gardenia blue after the ultrafiltration at a ratio of 1 w/w %, 3 w/w % or 5 w/w %, and the mixture was stirred at normal temperature with a stirrer, and the color value and the geniposide content were measured after an hour, after 3 hours, and after 5 hours. Table 4 shows colorant residual ratios (after 5 hours) calculated from these measurement values. Further, Table 4 and FIG. 3 show graphs of the total content of geniposide and genipin (Total G/CV100) based on a color value of 100 calculated from these measurement values.

TABLE 4

| Activated Carbon Amount | Total G/CV100 (Before Treatment) | Total G/CV100 (1 h) | Total G/CV100 (3 h) | Total G/CV100 (5 h) | Colorant Residual Ratio (5 h) |
|---|---|---|---|---|---|
| 1 w/w % | 432 ppm | 321 ppm | 268 ppm | 262 ppm | 100% |
| 3 w/w % | 432 ppm | 135 ppm | 84 ppm | 57 ppm | 97% |
| 5 w/w % | 432 ppm | 4 ppm | 3 ppm | 3 ppm | 95% |

Figure 3:
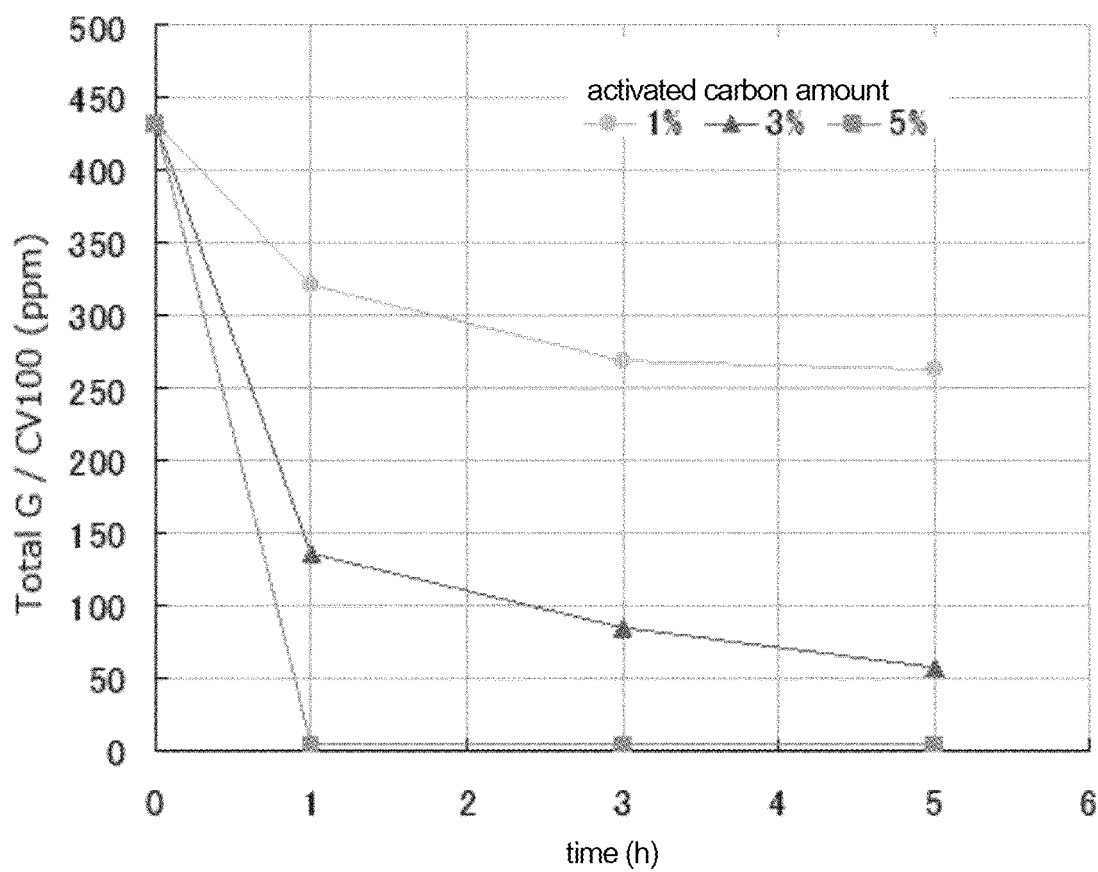
FIG. 3 is a graph showing geniposide content based on a color value of 100 relative to activated carbon treatment time (Production Test Example 1).

As shown in Table 4 and FIG. 3, there was a tendency for the total content of geniposide and genipin based on a color value of 100 (Total G/CV100) to decrease as the amount of the activated carbon increased. Regarding the treatment time, there was a tendency that the decrease in the total content of geniposide and genipin based on a color value of 100 (Total G/CV100) became moderate when the treatment time exceeded an hour.

As is clear from Table 4, there was a tendency for the color value residual ratio to decrease as the amount of the activated carbon increased.

Production Test Example 2

For the consideration of the difference in the adsorption effect depending on the presence or absence of alcohol, solutions were prepared by adding 20 parts by weight of water or ethanol to 80 parts by weight of gardenia blue obtained after the ultrafiltration in Production Test Example 1, and activated carbon No. 9 was added thereto at a ratio of 1 w/w %. The mixture was stirred at normal temperature with a stirrer, and the color value and the geniposide content were measured after 5 hours. Table 5 shows colorant residual ratios calculated from these measurement values.

TABLE 5

| Test Fraction | Colorant Residual Ratio (5 h) |
|---|---|
| Water added (Ethanol not added) | 98% |
| Ethanol added | 93% |

Figure 4:
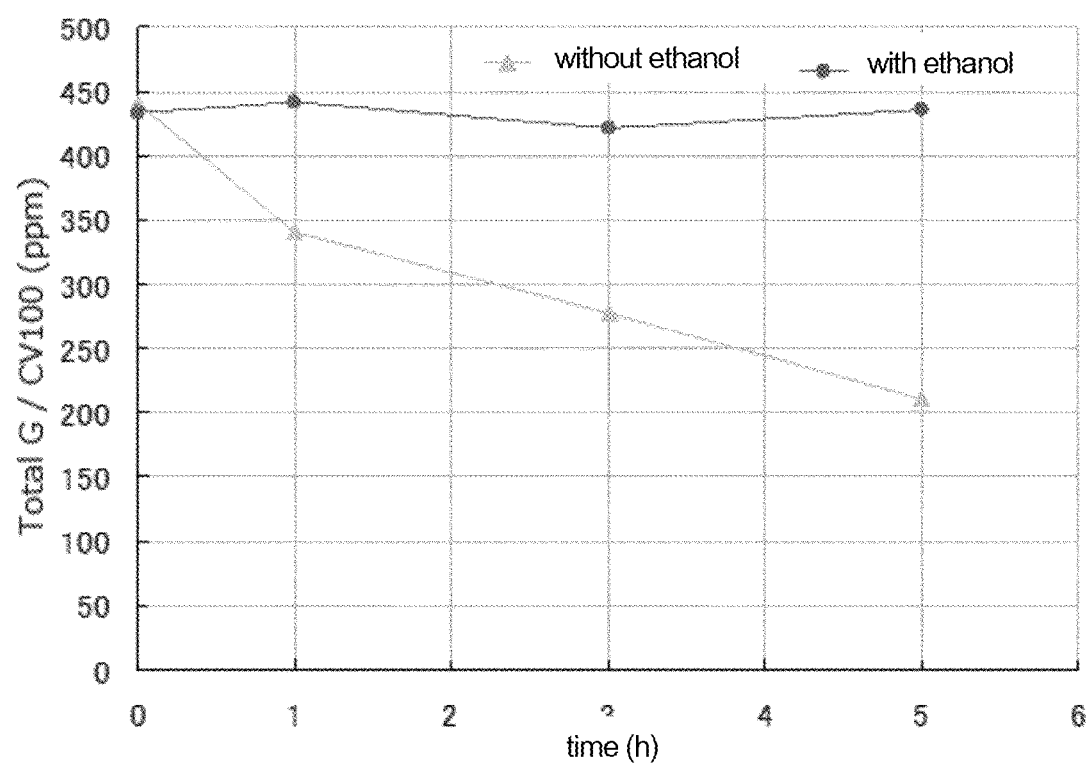
FIG. 4 is a graph showing a geniposide content based on a color value of 100 relative to activated carbon treatment time (Production Test Example 2).

Further, FIG. 4 shows a graph of the total content of geniposide and genipin based on a color value of 100 (Total G/CV100) in the test fraction without ethanol and the test fraction with ethanol in which activated carbon was added at a ratio of 1 w/w %.

As shown in FIG. 4, there was a tendency that, by the addition of ethanol, the colorant yield decreased and the total content of geniposide and genipin based on a color value of 100 (Total G/CV100) increased.

The results thus revealed that addition of no ethanol or a small amount of ethanol is preferred to achieve the object of the present invention.

Test Example 4

Analysis Regarding Relationship Between Nature of Activated Carbon, Geniposide Residual Ratio, and Color Value Residual Ratio The relationship between the nature of activated carbon, geniposide residual ratio, and color value residual ratio was analyzed.

The shapes, the raw materials, the activation methods, and the properties of the activated carbons used in Test Examples 1 and 2 were examined and analyzed, and the relationship between these natures of activated carbons, the geniposide residual ratio, and the color value residual ratio was analyzed.

Table 6 shows the results of these examinations and analyses. In Table 6, "Control" was not treated with activated carbon, and "ND" means less than the detection limit.

TABLE 6

| Activated Carbon No. | Shape | Raw Material | Activation Method | Iodine Adsorption Ability (mg/g) | Methylene Blue Adsorption Ability (ml/g) | Specific Surface Area (m2/g) | Pore Volume (ml/g) | Test Example 1 Geniposide Residual Ratio (%) | Test Example 2 Color Value Residual Ratio (%) |
|---|---|---|---|---|---|---|---|---|---|
| Control | — | — | — | — | — | — | — | — | — |
| 12 | Powder | Palm Shell | Water Vapor | 710 | 30 | 620 | 0.28 | 94.1 | — |
| 8 | Granules | Palm Shell | Water Vapor | 710 | 30 | 620 | 0.28 | 91.1 | — |
| 10 | Powder | Palm Shell | Water Vapor | 710 | 30 | 620 | 0.28 | 71.2 | — |
| 4 | Granules | Wood Flour | Zinc Chloride | 950 | 150 | 1341 | 1.12 | 0.9 | 96.6 |
| 16 | Powder | Wood Flour | Water Vapor | 950 | 100 | 1045 | 0.61 | 0.5 | 100 |
| 6 | Powder | Wood Flour | Zinc Chloride | 950 | 150 | 1516 | 1.37 | 0.45 | 95.3 |
| 2 | Powder | Wood Flour | Zinc Chloride | 950 | 150 | 1496 | 1.44 | 0.4 | — |
| 1 | Powder | Wood Flour | Zinc Chloride | 960 | 160 | 1556 | 1.46 | 0.4 | — |
| 15 | Powder | Wood Flour | Zinc Chloride | 1000 | 160 | 1555 | 1.49 | 2.2 | 97.3 |
| 14 | Powder | Wood Flour | Water Vapor | 1020 | 160 | 1151 | 0.78 | 0.4 | 100.4 |
| 13 | Powder | Palm Shell | Water Vapor | 1080 | 120 | 1031 | 0.48 | 0.5 | 100.7 |

TABLE 6-continued

| Activated Carbon No. | Shape | Raw Material | Activation Method | Iodine Adsorption Ability (mg/g) | Methylene Blue Adsorption Ability (ml/g) | Specific Surface Area (m2/g) | Pore Volume (ml/g) | Test Example 1 Geniposide Residual Ratio (%) | Test Example 2 Color Value Residual Ratio (%) |
|---|---|---|---|---|---|---|---|---|---|
| 11 | Powder | Palm Shell | Water Vapor | 1280 | 170 | 1150 | 0.51 | ND | 101.1 |
| 9 | Powder | Palm Shell | Water Vapor | 1550 | 230 | 1660 | 0.78 | ND | 99.8 |
| 3 | Granules | Palm Shell | Water Vapor | 1570 | 310 | 1707 | 0.79 | 1.3 | — |
| 7 | Granules | Palm Shell | Water Vapor | 1610 | 320 | 1600 | 0.74 | 0.5 | 99.4 |

As shown in Table 6, there was a tendency that activated carbons having high methylene blue adsorption ability and high iodine adsorption ability selectively adsorbed geniposide.

Further, there was also a tendency that activated carbons having a pore volume of less than 1.12 had a significantly high gardenia blue colorant residual ratio.

Further, the specific surface area is preferably greater to ensure greater adsorption of geniposide. In particular, the results showed that the geniposide residual ratio based on a color value of 100 was low when the specific surface area was 650 m$^2$/g or more.

Test Example 5

Gardenia Yellow 0.57 g of purified geniposide (geniposide content=34.8 w/w %) derived from a gardenia fruit was added to 100 g of a 5% solution of crocin (Tokyo Chemical Industry Co., Ltd.) so that the geniposide content was about 2000 ppm. 20 g each of the mixture was placed in three 50-ml screw tubes, which were respectively used as a control (not treated with activated carbon), a fraction with activated carbon No. 7, and a fraction with activated carbon No. 8. The addition amount of the activated carbon was 5 w/w % (1 g each).

Each sample was stirred for three hours at normal temperature, and the color value and the geniposide content were measured. Table 7 shows color value residual ratios and geniposide residual ratios calculated from these measurement values.

TABLE 7

| Test Fraction | Color Value Residual Ratio (%) | Geniposide Residual Ratio (%) |
|---|---|---|
| Control | 96 | 100 |
| Activated Carbon No. 7 | 87 | 4 |
| Activated Carbon No. 8 | 93 | 90 |

As shown in Table 7, when the useful component was gardenia yellow as well, as in the case of gardenia blue, geniposide was selectively removed while preventing the loss of the useful component when activated carbon No. 7 was used. In contrast, when the useful component was gardenia yellow as well, as in the case of gardenia blue, the geniposide removal failed when activated carbon No. 8 was used, although the color value residual ratio was high.

Reference Example 1

Analysis of Commercially Available Gardenia Blue

Four kinds of commercially available gardenia blue were analyzed to be compared with the gardenia blue of the present invention.

Table 8 shows the results. In Table 8, "ND" is less than the detection limit.

TABLE 8

| Product | Color Value | Geniposide/ CV100 (ppm) | Genipin/ CV100 (ppm) | Total G/ CV100 (ppm) |
|---|---|---|---|---|
| A | 218.2 | 330 | ND | 330 |
| B | 189.0 | 783 | ND | 783 |
| C | 186.2 | 552 | ND | 552 |
| D | 190.9 | 467 | ND | 467 |

As is clearly shown in Table 8, the total content of geniposide and genipin in a commercially available gardenia blue based on a color value of 100 was at least more than 300 ppm.

Reference Example 2

Consideration of Geniposide Removal from Gardenia Blue Using Anion-Exchange Resin The possibility of geniposide removal from gardenia blue using an anion-exchange resin was considered.

A geniposide removal test was performed using a weakly basic anion-exchange resin IRA96SB (product name, Organo Corporation) using a column method. This resin had been confirmed for a certain geniposide adsorption effect in a batch-type preliminary test.

The test was performed as follows.

Resin Conditioning

IRA96SB was immersed in ion-exchanged water overnight to be swollen, and 20 ml of the swollen resin was placed in a column (3 columns).

Adsorption Test

Test Liquid A: about 30 ppm solution of geniposide sample (pH=6.18)
Test Liquid B: gardenia blue liquid (color value=82.6) (pH=6.04)
Test Liquid C: gardenia blue liquid (color value=82.6) (pH=9.30, adjusted with 48% NaOH).

20.00 g each of Test Liquids A to C were fed at a velocity of about 2 SV (space velocity), and water-washing was performed by feeding ion-exchanged water in an amount three times (60 ml) the amount of each resin at a velocity of about 4 SV. All liquids from the beginning of the liquid feed to the end of the water-washing were collected (about 80 g).

The geniposide content of each sample was measured by HPLC.

Table 9 shows the results. In Table 9, the numbers (%) in parentheses denote a recovery ratio.

TABLE 9

| | | Liquid Amount (g) | Color Value | Geniposide Concentration (ppm) | Genipin Concentration (ppm) | Total G/CV100 Concentration (ppm) | Total G Amount (μg) | pH |
|---|---|---|---|---|---|---|---|---|
| Before Resin Treatment | Test Liquid A | 20.00 | — | 58 | ND | — | 1160 | 6.18 |
| | Test Liquid B | 20.00 | 82.55 | 1486 | ND | 1800 | 29720 | 6.04 |
| | Test Liquid C | 20.00 | 82.55 | 1486 | ND | 1800 | 29720 | 9.30 |
| After Resin Treatment | Test Liquid A | 83.49 | — | 15 | ND | — | 1252 (108%) | 2.96 |
| | Test Liquid B | 82.81 | 11.18 | 295 | ND | 2638 | 24429 (82%) | 4.81 |
| | Test Liquid C | 81.89 | 12.44 | 305 | ND | 2451 | 24976 (84%) | 5.00 |

As shown in Table 9, a geniposide removal effect was not observed in any of the geniposide sample (Test Liquid A) and the gardenia blue liquids (Test Liquids B and C). Rather, in the test using gardenia blue liquids (Test Liquids B and C), the geniposide recovery ratio were about 80%, in contrast to the colorant recovery ratio of about 60%; in addition, the geniposide concentration based on a color value of 100 increased after the resin treatment.

Further, although the adsorption difference depending on the pH in the liquid feed was not clearly observed, assuming, inconveniently, the actual step, there was a tendency that precipitates were more easily generated in the resin and the recovered liquid when the pH was low.

Therefore, after this test, it was concluded that geniposide removal from gardenia blue using a weakly basic anion-exchange resin is difficult.

Reference Example 3

Consideration of Geniposide Removal from Gardenia Blue by Acid Precipitation or Base Precipitation The possibility of geniposide removal from gardenia blue by acid precipitation or base precipitation was considered.

The test was performed as follows.
Preparation of Gardenia Blue

β-glucosidase was caused to act on purified geniposide (geniposide content=36.9 w/w %) derived from a gardenia fruit in the presence of a protein hydrolysate, thereby obtaining gardenia blue (solution state, color value=118.1, geniposide content=2288 ppm).
Acid Precipitation 50 g of sterilized gardenia blue was adjusted to have a pH of 2.5 using 97% sulfuric acid. The mixture was stirred with a stirrer, and kept still overnight at normal temperature. The supernatant and the precipitate were transferred to a centrifuging tube, and subjected to 3000G×20 minutes centrifugation. The supernatant was isolated. The residual precipitate was washed twice with sulfuric acid water adjusted to pH 2.5, and further washed once with ion-exchanged water. An appropriate amount of ion-exchanged water was added to the washed precipitate, thereby dissolving a part of the precipitate. At this time, an appropriate amount of 47% NaOH was added to dissolve the precipitate.

The geniposide contents in the resulting supernatant and the precipitate were measured by HPLC.

Base Precipitation 23.6 g of ammonium sulfate was added to 50 g of sterilized gardenia blue. The mixture was stirred with a stirrer, and kept still overnight at normal temperature. The supernatant and the precipitate were transferred to a centrifuging tube, and subjected to 3000G×20 minutes centrifugation. The supernatant was isolated. The residual precipitate was washed twice with ammonium sulfate water having a saturation degree of 70%, and further washed once with ion-exchanged water. An appropriate amount of ion-exchanged water was added to the washed precipitate, thereby dissolving a part of the precipitate.

The geniposide contents in the resulting supernatant and the precipitate were measured by HPLC.

Table 10 shows the results. In Table 10, since the precipitate dilution ratio is not precise, the numbers in parentheses show reference values.

TABLE 10

| | | Acid Precipitation | | Base precipitation | |
|---|---|---|---|---|---|
| | Before Treatment | Super-natant | Precip-itate | Super-natant | Precip-itate |
| Color Value | 118.1 | 27.3 | (5.3) | 0.9 | (72.0) |
| Geniposide Content (ppm) | 2288 | 2008 | (69) | 242 | (1146) |
| Geniposide/CV100 (ppm) | 1938 | 7356 | 1304 | 26931 | 1591 |

As is clearly shown in Table 10, the geniposide contents based on a color value of 100 (geniposide/CV100) were large in both the supernatant and the precipitate in the acid precipitation and the base precipitation. It was thus concluded that it is difficult to remove geniposide and genipin from a colorant component by acid precipitation or base precipitation.

Production Test Example 3

Production of Geniposide-Reduced Gardenia Blue 2
Step 1

β-glucosidase was caused to act on purified geniposide (geniposide content=35.7 w/w %) derived from a gardenia fruit in tap water in the presence of a protein hydrolysate, thereby preparing gardenia blue (solution state, liquid measure=1200 L, color value=105.2, geniposide content based on a color value of 100=597.4 ppm, genipin content=less than the detection limit).

The obtained gardenia colorant was filtrated under the following filtration conditions, thereby obtaining gardenia blue as the filtrate (solution state, liquid measure=1900 L, color value=65.2).

Filtration Conditions
Filtration facility: filter press
Filtration adjuvant: diatomaceous earth
Filtration adjuvant precoating amount: 30 kg
Filtration adjuvant body-feed amount: 20 kg
Step 2

The gardenia blue after the filtration in the filtration facility was treated (0.5 MPa, 5 hours) with an ultrafilter membrane (molecular weight cut-off=3000), thereby obtaining gardenia blue (solution state, liquid measure=1300 L, color value=96.0, solids content=11.7%, color value/solids content=820.5, yield=98.9%).

Step 3

Activated carbon No. 9 was added to the gardenia blue after the ultrafiltration in an amount of 3 w/w %, followed by cooling to 15° C., 2-hour stirring with a stirrer, and standing still overnight.

The obtained gardenia blue was filtrated under the following filtration conditions, thereby obtaining gardenia blue as the filtrate (solution state, liquid measure=2800 L, color value=41.7).

Filtration Conditions
Filtration facility: filter press
Filtration adjuvant: diatomaceous earth
Filtration adjuvant precoating amount: 30 kg
Filtration adjuvant body-feed amount: 58 kg
Step 4

The filtrate obtained through the filtration in step 3 containing gardenia blue was concentrated under reduced pressure, thereby obtaining gardenia blue (color value=242.9, liquid measure=343 kg).

The geniposide and genipin contents of the gardenia blue were measured, and the results showed that the geniposide content was 1.6 ppm (0.7 ppm/CV100) and the genipin content was less than the detection limit.

More specifically, the total content of geniposide and genipin based on a color value of 100 (Total G/CV100) was 0.7 ppm/CV100.

Test Example 6

Gardenia Red

β-glucosidase was caused to act on an ester hydrolysate of purified geniposide derived from a gardenia fruit in the presence of a protein hydrolysate, and purified geniposide derived from a gardenia fruit (geniposide content=36.5 w/w %, genipin content=less than the detection limit) was added to the resulting gardenia red so that the geniposide content became about 2000 ppm, thereby preparing geniposide-containing gardenia red.

20 g each of the geniposide-containing gardenia red (this colorant was made into a solution adjusted with water to have a color value of 100) was placed in three 50-ml screw tubes, which were respectively used as a control (not treated with activated carbon), a fraction with activated carbon No. 7, and a fraction with activated carbon No. 8. The addition amount of the activated carbon was 5 w/w % (1 g each).

Each sample was stirred for three hours at normal temperature, and filtrated with a 0.2 μm filter, thereby obtaining a sample.

The color values and the geniposide contents of the filtrated samples were measured. Table 11 shows color value residual ratios and geniposide residual ratios calculated from these measurement values. In Table 11, "ND" means less than the detection limit.

TABLE 11

|  | Color Value Residual Ratio (%) | Geniposide Content (ppm) | Geniposide Content/ CV100 (ppm) | Geniposide Residual Ratio (%) |
|---|---|---|---|---|
| Control | 101.9 | 1913.3 | 1877.6 | 100 |
| Activated Carbon No. 7 | 103.1 | ND | ND | 0 |
| Activated Carbon No. 8 | 105.4 | 1827.8 | 1734.2 | 92 |

As shown in Table 11, when the useful component was gardenia red as well, as in the case of gardenia blue, geniposide was selectively removed while preventing the loss of the useful component when activated carbon No. 7 was used. In contrast, as in the case of gardenia blue, the geniposide removal failed when activated carbon No. 8 was used, although the color value residual ratio was high.

The invention claimed is:

1. A method for reducing an amount of geniposide, genipin or both in a material comprising the geniposide, genipin or both, and a colorant component,
    the method comprising treating said material with an activated carbon having:
    (a) a methylene blue adsorption ability in a range of 50 ml/g or more, and
    (b) an iodine adsorption ability in a range of 750 mg/g or more,
    thereby reducing the amount of the geniposide, genipin or both in said material,
    wherein a residual ratio of the content of a colorant component in said material after the treatment relative to a content of the colorant in said material before the treatment is 85% or more obtained by the following formula:

the residual ratio (%)=(a color value of said material after the treatment)/(a color value of said material before the treatment)×100.

2. The method according to claim 1,
    wherein the material is a color composition comprising the color component selected from the group consisting of gardenia yellow, gardenia blue, and gardenia red, which are derived from a gardenia fruit.

3. The method according to claim 1,
    wherein the material is a color composition comprising the color component selected from the group consisting of genipap blue and genipap red, which are derived from a gardenia fruit.

4. The method according to claim 1,
    wherein the activated carbon has a pore volume in a range from 0.25 to 1.49 mL/g.

5. The method according to claim 1,
    wherein the activated carbon has a specific surface area in a range from 650 to 2000 m$^2$/g.

6. The method according to claim 1,
    wherein a residual ratio of the total content of the geniposide and the genipin in the material after the treatment is in a range of 20% or less relative to the total content in the material before the treatment.

7. A method for producing a gardenia-derived colorant composition in which a total content of geniposide and genipin is reduced, the method comprising treating the gardenia-derived colorant composition comprising the geniposide, genipin or both and a gardenia derived colorant with an activated carbon having:
(a) a methylene blue adsorption ability in a range of 50 ml/g or more, and
(b) an iodine adsorption ability in a range of 750 mg/g or more, thereby reducing the amount of the geniposide, genipin or both in said gardenia-derived colorant composition, wherein a residual ratio of the content of a gardenia-derived colorant in said gardenia-derived colorant composition after the treatment relative to a content of gardenia-derived colorant in said gardenia-derived colorant composition before the treatment is 85% or more obtained by the following formula:

the residual ratio (%)=(a color value of said gardenia-derived colorant composition after the treatment)/(a color value of said gardenia-derived colorant composition before the treatment)×100.

8. The method according to claim 7, wherein the gardenia-derived colorant is gardenia blue, gardenia red, or gardenia yellow.

\* \* \* \* \*